United States Patent
Oh et al.

(10) Patent No.: US 7,102,309 B2
(45) Date of Patent: Sep. 5, 2006

(54) APPARATUS FOR COMPENSATING FOR SPEED ERROR OF MOTOR

(75) Inventors: Jae-Yoon Oh, Gyeonggi-Do (KR); Dal-Ho Cheong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/882,252

(22) Filed: Jul. 2, 2004

(65) Prior Publication Data
US 2005/0062448 A1   Mar. 24, 2005

(30) Foreign Application Priority Data
Sep. 20, 2003   (KR)   ................. 10-2003-0065390

(51) Int. Cl.
*H02P 1/00* (2006.01)
*H02P 1/22* (2006.01)

(52) U.S. Cl. .............. 318/268; 318/270; 318/271; 318/272; 318/255; 318/59

(58) Field of Classification Search ............. 318/432, 318/268, 721, 609, 270, 271, 272, 255, 59
See application file for complete search history.

(56) References Cited

U.S. PATENT DOCUMENTS

| | | | | |
|---|---|---|---|---|
| 4,736,143 A | * | 4/1988 | Nakamura et al. | 318/432 |
| 4,980,617 A | * | 12/1990 | Tajima et al. | 318/254 |
| 5,319,297 A | * | 6/1994 | Bahn | 318/701 |
| 5,430,362 A | * | 7/1995 | Carr et al. | 318/779 |
| 6,646,409 B1 | * | 11/2003 | Won et al. | 318/701 |
| 6,674,262 B1 | * | 1/2004 | Kitajima et al. | 318/722 |
| 6,735,284 B1 | * | 5/2004 | Cheong et al. | 318/801 |
| 2003/0025475 A1 | | 2/2003 | Won et al. | |

FOREIGN PATENT DOCUMENTS

| | | |
|---|---|---|
| CN | 1392664 | 1/2003 |
| JP | 8-126378 | 5/1996 |
| KR | 2002-016290 | 3/2002 |

OTHER PUBLICATIONS

English language Abstract of Korea 2002-016290.
English language Abstract of JP 8-126378.

* cited by examiner

*Primary Examiner*—Rita Leykin
(74) *Attorney, Agent, or Firm*—Greenblum & Bernstein, P.L.C.

(57) ABSTRACT

The present invention discloses an apparatus for compensating for a speed error of a motor which can reduce a speed ripple of the motor resulting from load characteristics, and which also can reduce vibrations and noises. The apparatus for compensating for the speed error of the motor divides a rotational section corresponding to one complete revolution of a rotor of the motor into a plurality of preset rotational sections, determines a speed compensation value in each divided rotational section on the basis of a difference value between a reference speed and a previous estimated speed, and compensates for the speed error of the motor on the basis of the speed compensation value.

4 Claims, 6 Drawing Sheets

APPARATUS FOR COMPENSATING FOR SPEED ERROR OF MOTOR

BACKGROUND OF THE INVENTION

1. Field of the Invention

The present invention relates to a motor, and more particularly to, an apparatus for compensating for a speed error of a motor.

2. Description of the Conventional Art

In general, load characteristics of a compressor driven by a motor are varied by a compression type. Especially, according to the load characteristics of the compressor, when a single rotary compressor having a drive torque ripple is rotated, a torque ripple of the compressor increases, and a speed ripple of the motor increases due to the torque ripple of the compressor. That is, when a load having a torque ripple component such as the single rotary compressor is coupled to the motor, the speed ripple is generated by the torque ripple of the load.

FIG. 1 is a schematic diagram illustrating a conventional single rotary compressor. A compression unit (refer to FIG. 2) of the single rotary compressor is coupled to a rotor of a motor through a shaft, and a vane is coupled to the shaft of the motor. The operational principle of the compression unit will now be explained with reference to FIG. 2.

FIG. 2 is a diagram showing the operational principle of the compression unit.

Referring to FIG. 2, when the motor coupled to the compression unit is rotated, the vane of the compressor is rotated, to perform a compression stroke. When the vane of the compression unit is mechanically rotated once, the compression stroke is also performed once. Here, the motor coupled to the compressor has a speed ripple due to compression characteristics of the compressor, which will now be described with reference to FIGS. 3A and 3B.

FIGS. 3A and 3B are graphs showing characteristics of the conventional single rotary compressor.

As shown in FIGS. 3A and 3B, a torque ripple of the compressor is generated due to the compression characteristics (load characteristics) of the compressor, and a speed ripple is generated in the motor coupled to the compressor due to the torque ripple of the compressor. In FIG. 3A, θ denotes a rotational angle of the motor. Although the detailed structure of an apparatus for controlling a rotational speed of the motor installed in the compressor may be changed according to a kind of the motor, the apparatus generally includes a speed controller and a current controller. In addition, when the apparatus for controlling the rotational speed of the motor estimates the speed of the motor, the apparatus detects current and voltage values supplied to the motor, and estimates the speed of the motor on the basis of the detected current and voltage values. Here, the apparatus for controlling the rotational speed of the motor has the characteristics (torque ripple) of the compressor as shown in FIG. 3A, and thus generates the speed ripple of the motor as shown in FIG. 3B. However, vibrations and noises of the compressor are increased and performance thereof is decreased due to the speed ripple of the motor.

On the other hand, in order to solve the above problems, a conventional method for compensating for a torque calculates load characteristics (compressor torque) in advance in an offline method, and generates a lookup table to control the motor torque according to the previously-calculated load characteristics. The conventional method for compensating for the torque will now be explained with reference to FIG. 4.

FIG. 4 is a graph showing the conventional method for compensating for the torque. The conventional method for compensating for the torque is generally used in a brushless DC (BLDC) motor which does not supply a pulse width modulation (PWM) signal in electrical 60° rotational section and which supplies the PWM signal only in 120° rotational section. According to sensorless characteristics of the BLDC motor driven by measuring a counter-electromotive force in 60° rotational section, a position of a rotor can be sensed merely at electrical 60° interval. Therefore, the position of the rotor is detected 6 times in one electrical rotation, and the torque of the motor is compensated for on the basis of the detected position values of the rotor.

However, as depicted in FIG. 4, according to the method using the lookup table for storing the previously-calculated compensation value, the torque of the motor can be compensated for merely in the position of the rotor where the compensation value stored in the lookup table has been calculated. Accordingly, a reference position of the rotor needs to be set. Here, an error of the reference position of the rotor has a reverse effect on compensation for the torque.

In the case that the compensation value corresponding to the lookup table is used, compensation values considering load variations in the compressor must be all experimentally calculated. Moreover, when a model of the compressor is upgraded, compensation values considering load variations in the compressor must be all experimentally calculated in advance.

On the other hand, the conventional apparatus for controlling the rotational speed of the motor was disclosed under U.S. Pat. No. 6,646,409 on Nov. 11, 2003.

SUMMARY OF THE INVENTION

Therefore, an object of the present invention is to provide an apparatus for compensating for a speed error of a motor which can reduce a speed ripple of the motor resulting from load characteristics, and which also can reduce vibrations and noises.

To achieve these and other advantages and in accordance with the purpose of the present invention, as embodied and broadly described herein, there is provided an apparatus for compensating for a speed error of a motor which divides a rotational section corresponding to one complete revolution of a rotor of the motor into a plurality of preset rotational sections, determines a speed compensation value in each divided rotational section on the basis of a difference value between a reference speed and a previous estimated speed, and compensates for the speed error of the motor on the basis of the speed compensation value.

According to one aspect of the invention, an apparatus for compensating for a speed error of a motor includes: a speed compensator for dividing a rotational section corresponding to one complete revolution of a rotor of the motor into a plurality of preset rotational sections, comparing a reference speed of the motor with a previous estimated speed in each divided rotational section, calculating the speed error of the motor according to the comparison result, determining a speed compensation value for compensating for the speed error, and outputting the speed compensation value; a comparator for comparing the speed compensation value from the speed compensator, the reference speed and a current estimated speed of the motor; and a proportional integration controller for outputting a reference torque component current for compensating for a speed error value according to the comparison result of the comparator.

According to another aspect of the invention, an apparatus for compensating for a speed error of a motor includes: a speed compensator for comparing a reference speed of the motor with a previous estimated speed, calculating a previous speed error according to the comparison result, determining a speed compensation value for compensating for the previous speed error, and outputting the speed compensation value; a first proportional integration controller for generating a reference current for compensating for the speed corresponding to the speed compensation value; a first comparator for comparing the reference speed with a current estimated speed, and outputting a resulting speed error value; a second proportional integration controller for outputting a reference torque component current for compensating for the speed error value of the first comparator; a second comparator for comparing the reference torque component current, the reference current for compensating for the speed and a real torque component current, and outputting a resulting error value; and a third proportional integration controller for outputting a reference torque component voltage for compensating for the error value of the second comparator.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

An apparatus for compensating for a speed error of a motor which can reduce vibrations and noises resulting from load characteristics, by dividing a rotational section corresponding to one complete revolution of a rotor of the motor into a plurality of preset rotational sections, comparing a reference speed with a previous estimated speed in each divided rotational section, determining each speed compensation value, and compensating for a speed error between the reference speed and a current estimated speed on the basis of each speed compensation value will now be described in detail with reference to FIGS. 5A to 7.

Figure 1:
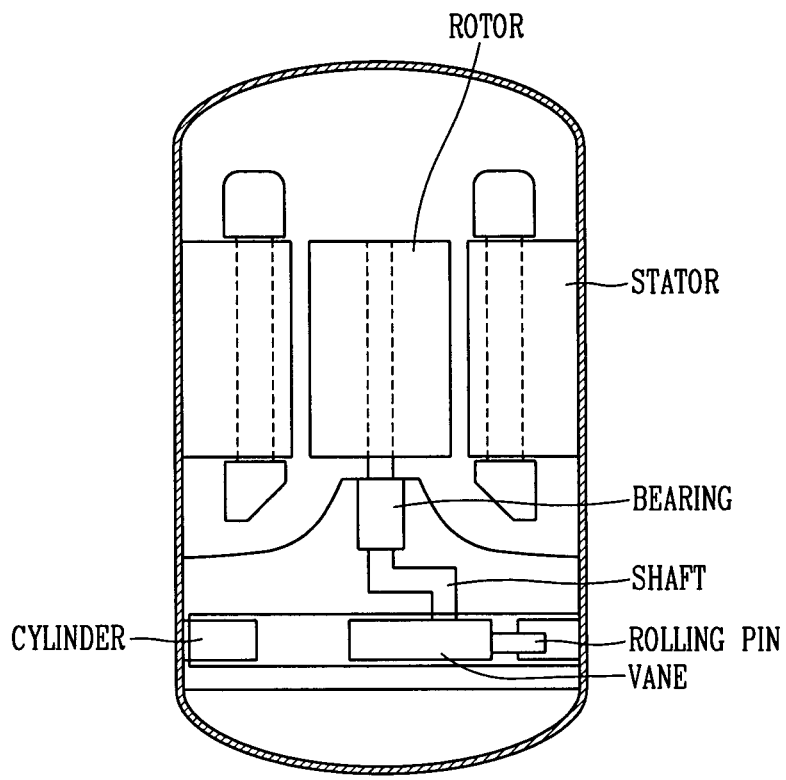
FIG. 1 is a schematic diagram illustrating a conventional single rotary compressor.
Figure 2:
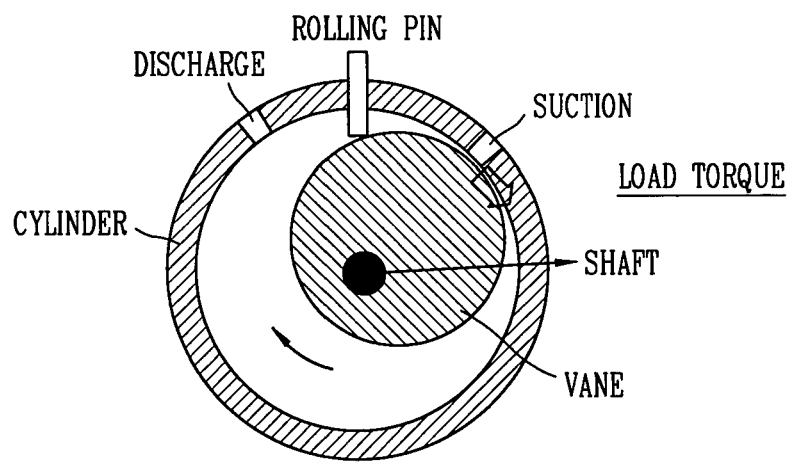
FIG. 2 is a diagram showing an operational principle of a compression unit.
Figure 3A:
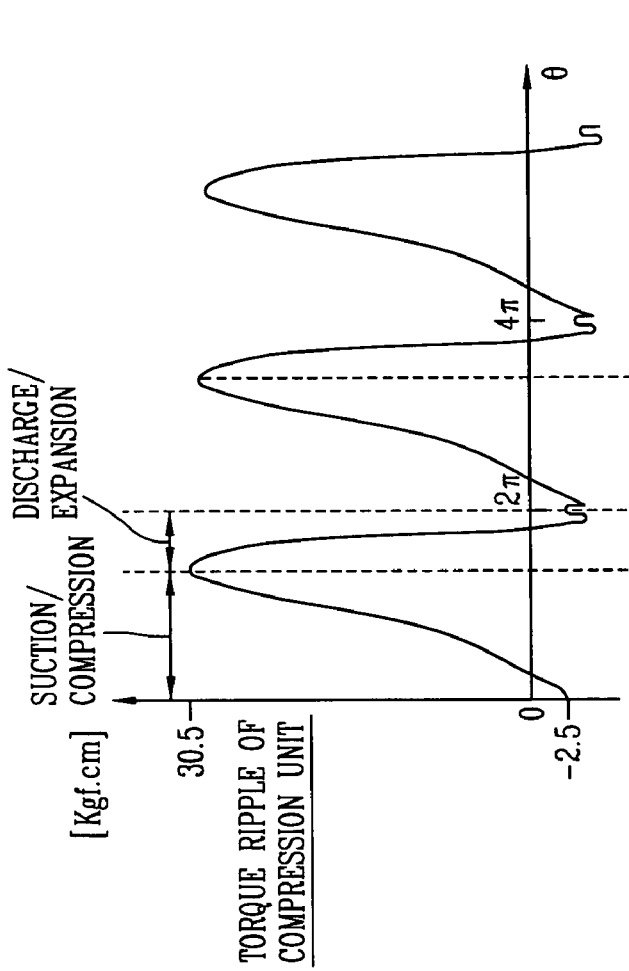
FIGS. 3A and 3B are graphs showing characteristics of the conventional single rotary compressor.
Figure 3B:
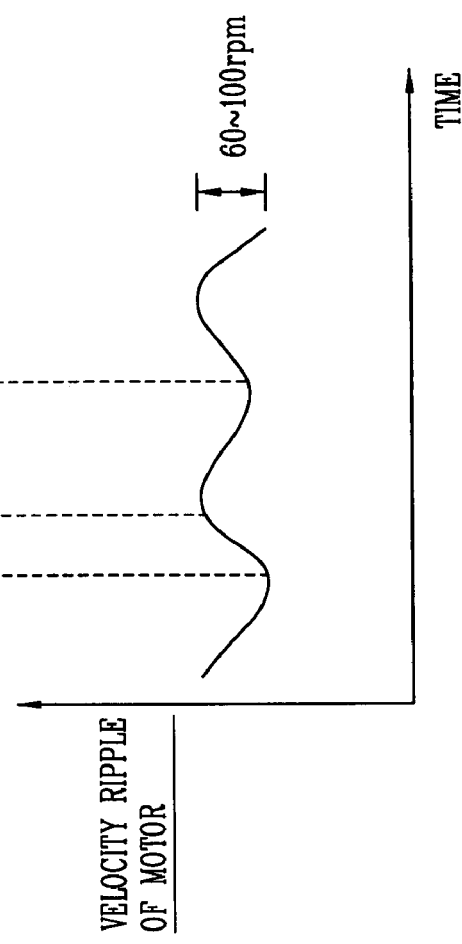
Figure 4:
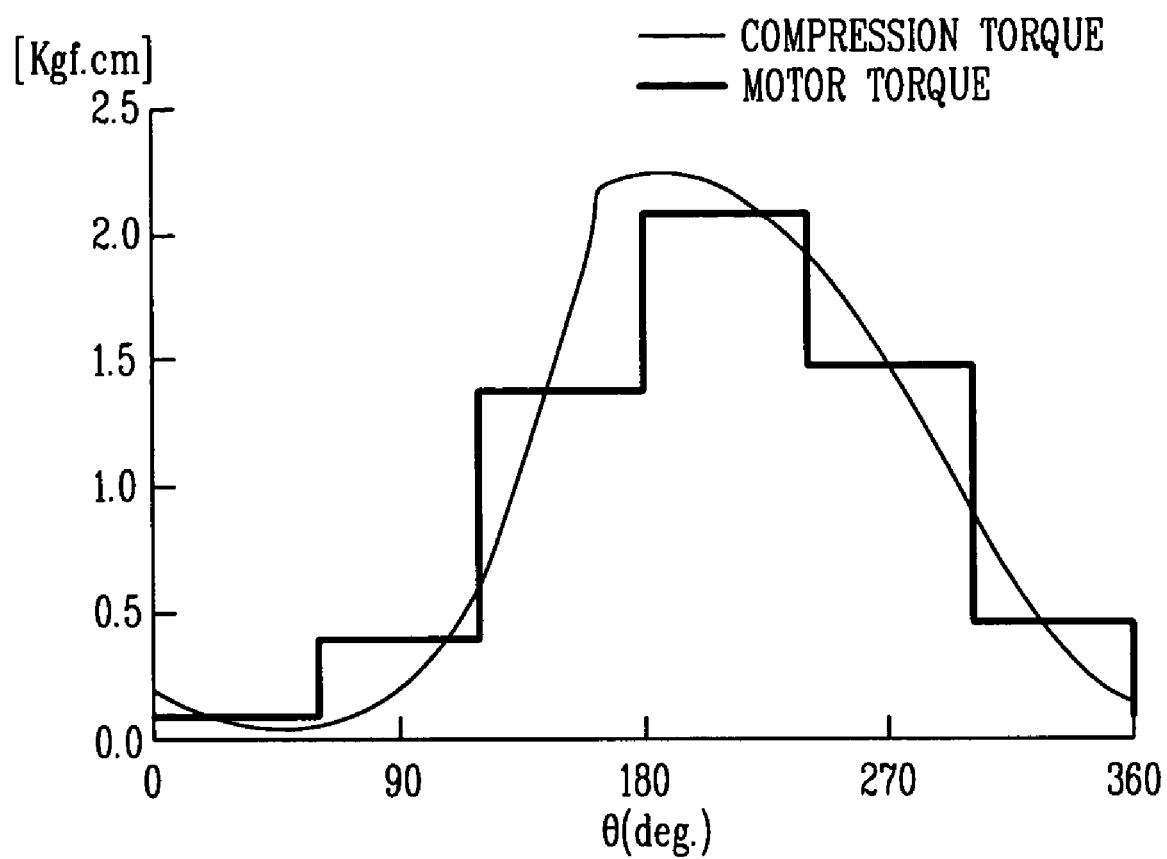
FIG. 4 is a graph showing a conventional method for compensating for a is torque.
Figure 5A:
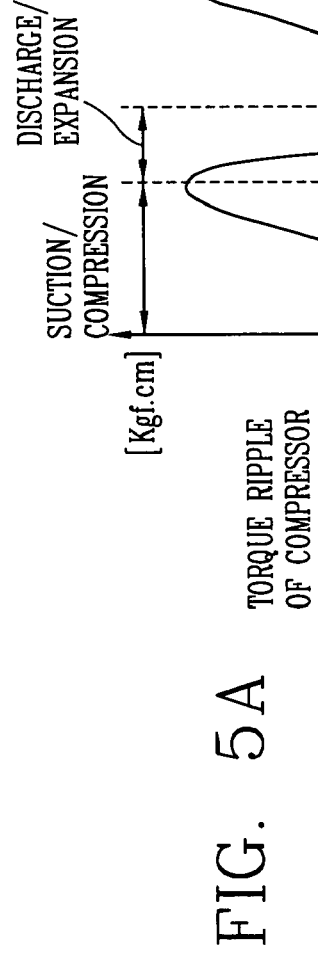
FIGS. 5A to 5C are graphs showing a principle of compensating for a speed error in accordance with the present invention.
Figure 5B:
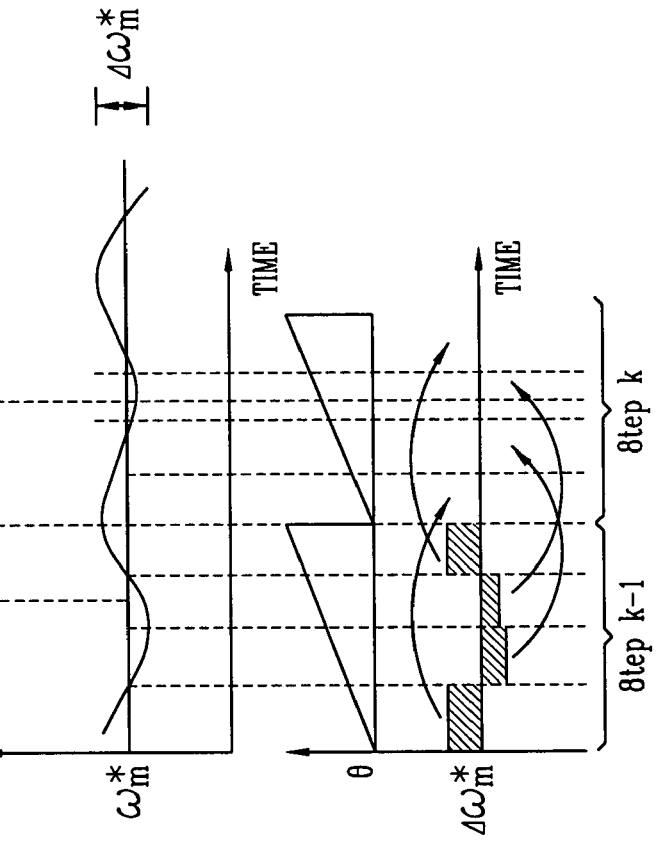
Figure 5C:
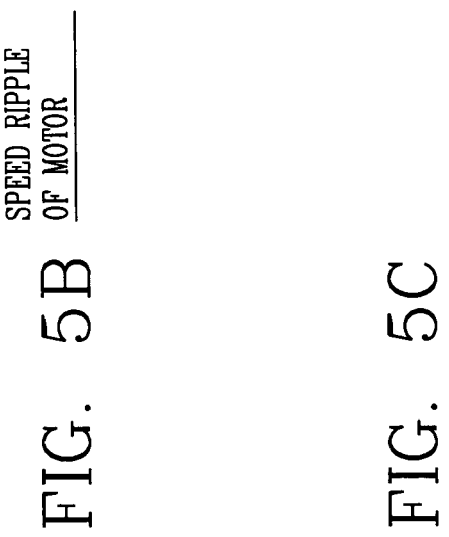

FIGS. 5A to 5C are graphs showing a principle of compensating for a speed error in accordance with the present invention. That is, FIGS. 5A to 5C are graphs showing a method for dividing a rotational section of a rotor of a motor corresponding to one complete revolution of the rotor into four preset rotational sections, and compensating for a speed error of the motor in each divided rotational section.

FIG. 5A shows a drive torque ripple resulting from load characteristics of a single rotary compressor, FIG. 5B shows a speed ripple of the motor resulting from load characteristics (torque ripple) of the single rotary compressor, and FIG. 5C shows a method for calculating a speed error average corresponding to the speed ripple in the four preset rotational sections, and compensating for the calculated speed error in the succeeding step.

As shown in FIGS. 5A to 5C, when the rotational section of the rotor of the motor corresponding to one complete revolution of the rotor is divided into the four preset rotational sections, even if a relative coupling position of the rotor of the motor and a compression unit is changed, the speed error of the motor resulting from the torque ripple can be compensated for. That is, noises or vibrations of the compressor can be reduced by decreasing the speed ripple by calculating the speed error corresponding to the speed ripple of the motor generated due to the torque ripple of the load such as the compression unit, and compensating for the calculated speed error, without setting a reference position of the rotor, regardless of an assembling position of the rotor and the compression unit. Accordingly, noises or vibrations of the load can be reduced by calculating the speed error in each preset rotational section, and compensating for the speed error in the succeeding step.

The structure of an apparatus for controlling a rotational speed of a motor which an apparatus for compensating for a speed error of a motor is applied to in accordance with a first embodiment of the present invention will now be explained in detail with reference to FIG. 6.

Figure 6:
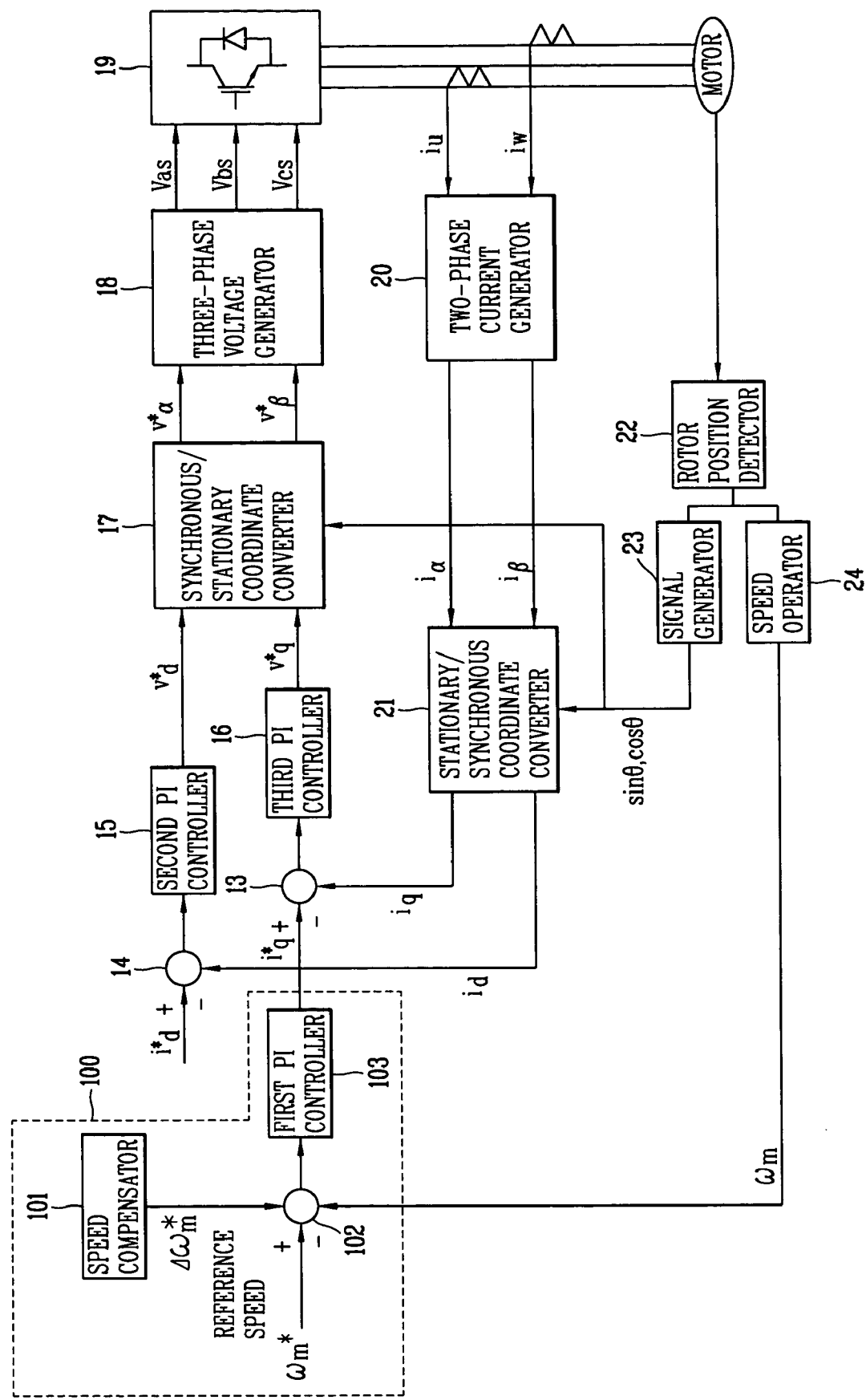
FIG. 6 is a block diagram illustrating an apparatus for controlling a rotational speed of a motor which an apparatus for compensating for a speed error of a motor is applied to in accordance with a first embodiment of the present invention.

FIG. 6 is a block diagram illustrating the apparatus for controlling the rotational speed of the motor which the apparatus for compensating for the speed error of the motor is applied to in accordance with the first embodiment of the present invention.

As illustrated in FIG. 6, the apparatus for controlling the rotational speed of the motor which the apparatus 100 for compensating for the speed error of the motor is applied to includes a speed compensator 101 for dividing a rotational section corresponding to one complete revolution of a rotor of the motor into a plurality of preset rotational sections, comparing a reference speed $\omega_m^*$ with a previous estimated speed $\omega_p$ in each divided rotational section, calculating a previous speed error according to the comparison result, determining a speed compensation value $\Delta\omega_m^*$ for compensating for the previous speed error, and outputting the speed compensation value $\Delta\omega_m^*$, a first comparator 102 for comparing the reference speed $\omega_m^*$ with a current estimated speed $\omega_m$, a first proportional integration (PI) controller 103 for outputting a reference torque component current $i_q^*$ for compensating for a speed error value according to the comparison result between the reference speed $\omega_m^*$ and the current estimated speed $\omega_m$ on the basis of the speed compensation value $\Delta\omega_m^*$ from the speed compensator 101, a second PI controller 15 for outputting a reference magnetic flux component current for compensating for an error value between a reference magnetic flux component current $i_d^*$ and a real magnetic flux component current $i_d$ as a reference magnetic flux component voltage $v_d^*$, a third PI controller 16 for outputting a reference torque component current for compensating for an error value obtained by comparing the reference torque component current $i_d^*$ with the real torque component current id as a reference torque component voltage $v_q^*$, a synchronous/stationary coordinate converter 17 for converting the reference magnetic flux component voltage $v_d^*$ and the reference torque component voltage $v_q^*$ from a synchronous coordinate system to a stationary coordinate system according to sine and cosine values (sin θ and cos θ) in a real magnetic flux angle θ, a three-phase voltage generator 18 for converting the reference magnetic flux component voltage $v_d^*$ and the reference torque component voltage $v_q^*$ of the stationary coordinate system into three-phase voltages Vas, Vbs and Vcs, and outputting the converted three-phase voltages Vas, Vbs and Vcs, an inverter 19 for supplying the three-phase voltages Vas, Vbs and Vcs generated in the three-phase voltage generator 18 to the motor, a rotor position detector 22 for detecting a position of the rotor of the motor, a speed operator 24 for outputting the current estimated speed $\omega_m$ from the detected position of the rotor, a signal generator 23 for generating the sine and cosine values (sin θ and cos θ) in the real magnetic flux angle θ from the detected position of the rotor, a two-phase current generator 20 for converting three-phase currents detected when the motor is rotated into two-phase currents $i_\alpha, i_\beta$, and a stationary/synchronous coordinate converter 21 for converting the two-phase currents $i_\alpha, i_\beta$ into a rotational coordinate system, and outputting the real torque component current $i_q$ and the magnetic flux component current $i_d$. Here, a third comparator 13 of FIG. 6 compares the reference torque component current $i_q^*$ from the first PI controller 12 with the real torque component current $i_q$ from the stationary/synchronous coordinate converter 21. In addition, a second comparator 14 compares the reference magnetic flux component current $i_d^*$ with the real magnetic flux component current $i_d$ from the stationary/synchronous coordinate converter 21, and outputs the resulting error value to the second PI controller 15.

The apparatus 100 for compensating for the speed error of the motor in accordance with the first embodiment of the present invention includes the speed compensator 101 for dividing the rotational section corresponding to one complete revolution of the rotor of the motor into the plurality of preset rotational sections, comparing the reference speed $\omega_m^*$ with the previous estimated speed $\omega_p$ in each divided rotational section, calculating the speed error according to the comparison result, determining the speed compensation value $\Delta\omega_m^*$ for compensating for the speed error, and outputting the speed compensation value $\Delta\omega_m^*$, the first comparator 102 for comparing the speed compensation value $\Delta\omega_m^*$ from the speed compensator 101, the reference speed $\omega_m^*$ and the current estimated speed $\omega_m$, and the first PI controller 103 for outputting the reference torque component current $i_q^*$ for compensating for the error value according to the comparison result. The apparatus for controlling the rotational speed of the motor is identical to the conventional one, except for the apparatus 100 for compensating for the speed error of the motor in accordance with the first embodiment of the present invention, and thus detailed explanations thereof are omitted.

The operation of the apparatus 100 for compensating for the speed error of the motor in accordance with the first embodiment of the present invention will now be described in detail with reference to FIG. 6.

The speed compensator 101 divides the rotational section corresponding to one complete revolution of the rotor of the motor into the plurality of preset rotational sections, compares the reference speed $\omega_m^*$ with the previous estimated speed $\omega_p$ in each divided rotational section, calculates the previous speed error according to the comparison result, determines the speed compensation value $\Delta\omega_m^*$ for compensating for the previous speed error, and outputs the speed compensation value $\Delta\omega_m^*$. For example, the speed compensator 101 compares the reference speed $\omega_m^*$ with the previous estimated speed $\omega_p$ in the four preset rotational sections, detects each speed error in each rotational section according to the comparison result, and determines the speed compensation value $\Delta\omega_m^*$ for reducing each detected speed error. Here, the preset rotational sections are obtained by dividing the rotational section of the rotor of the motor corresponding to one complete revolution of the rotor into four preset rotational sections. In accordance with the present invention, the rotational section of the rotor of the motor corresponding to one complete revolution of the rotor can be divided into a plurality of rotational sections.

The first comparator 102 compares the speed compensation value $\Delta\omega_m^*$ from the speed compensator 101, the reference speed $\omega_m^*$ and the current estimated speed $\omega_m$, and outputs the comparison result to the first PI controller 103.

The first PI controller 103 outputs the reference torque component current $i_q^*$ for compensating for the speed error value according to the comparison result. That is, the first PI controller 103 determines the compensation value $\Delta\omega_m^*$ for compensating for the error value between the reference speed $\omega_m^*$ and the previous estimated speed $\omega_p$ of the motor, adds the determined compensation value $\Delta\omega_m^*$ to the error value between the reference speed $\omega_m^*$ and the current estimated speed $\omega_m$, and outputs the reference torque component current $i_q^*$ corresponding to the added value. Therefore, the reference torque component current $i_q^*$ is outputted to the apparatus for controlling the rotational speed of the motor, thereby compensating for the speed error resulting from the load characteristics such as the compressor. The speed compensation value $\Delta\omega_m^*$ is represented by the following Equation 1:

$$\Delta\omega_m^* = k(\omega_m - \omega_m^*) \qquad \text{Equation 1}$$

Here, k denotes a variable for deciding a value and sign (+ or −) for compensating for the speed error between the reference speed and the current estimated speed in each preset rotational section (for example, four rotational sections). If '$\omega_m - \omega_m^*$' is greater than '0', it means that the estimated speed of the motor is higher than the reference speed. Therefore, the speed error between the estimated speed and the reference speed must be compensated for, by decreasing the k value to reduce the speed of the motor. As a result, the k value is set smaller than '0' so that the speed compensation value Δω* added to the comparator 200 can be set smaller than '0'.

Figure 7:
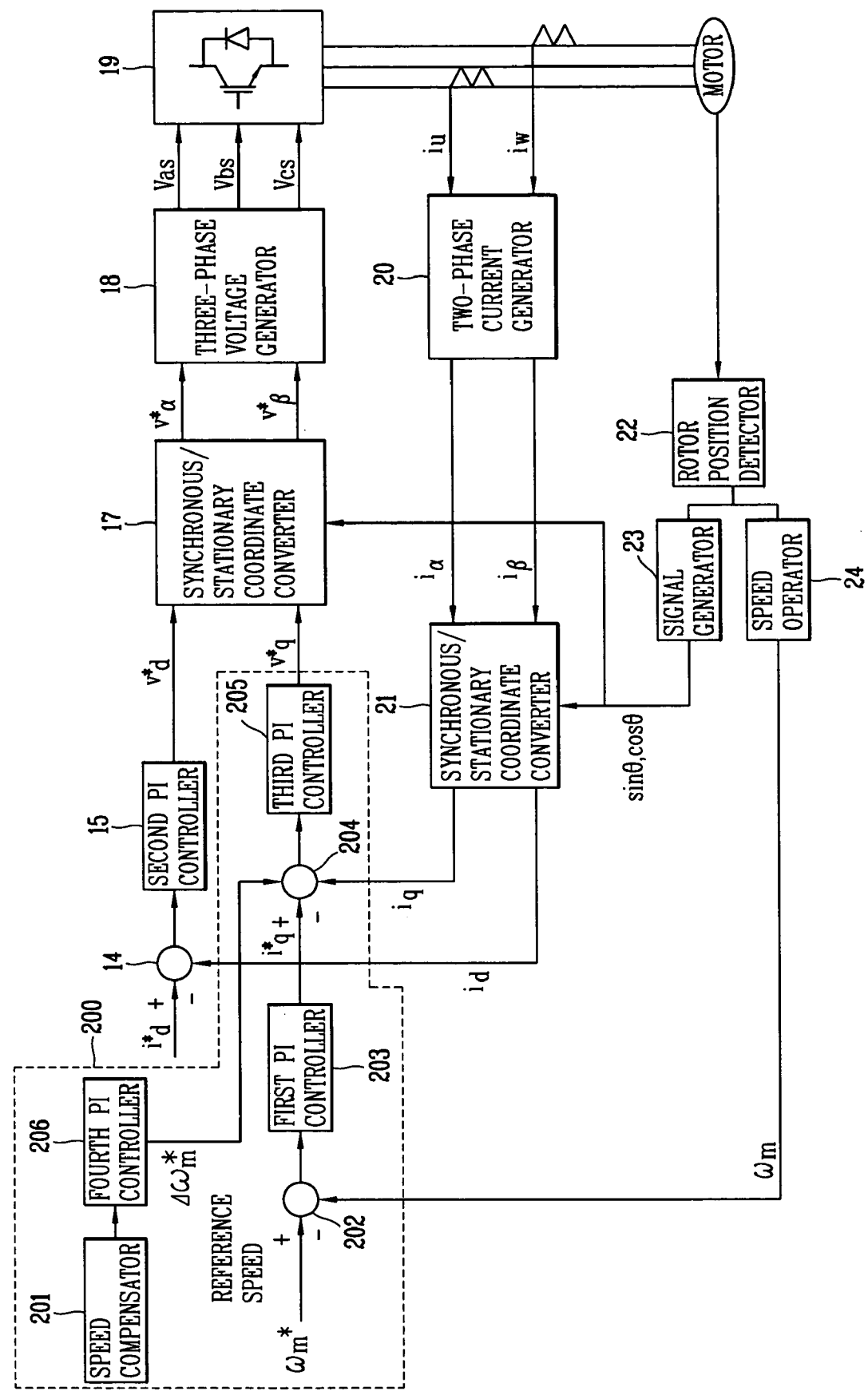
FIG. 7 is a block diagram illustrating an apparatus for controlling a rotational speed of a motor which an apparatus for compensating for a speed error of a motor is applied to in accordance with a second embodiment of the present invention.

FIG. 7 is a block diagram illustrating an apparatus for controlling a rotational speed of a motor which an apparatus for compensating for a speed error of a motor is applied to in accordance with a second embodiment of the present invention.

As depicted in FIG. 7, the apparatus for controlling the rotational speed of the motor which the apparatus 200 for compensating for the speed error of the motor is applied to includes a speed compensator 201 for dividing a rotational section corresponding to one complete revolution of a rotor of the motor into a plurality of preset rotational sections, comparing a reference speed $\omega_m^*$ with a previous estimated speed $\omega_p$ in each divided rotational section, calculating a previous speed error according to the comparison result, determining a speed compensation value $\Delta\omega_m^*$ for compensating for the previous speed error, and outputting the speed compensation value $\Delta\omega_m^*$, a fourth PI controller 206 for generating a reference current $i_q\Delta\omega_m^*$ for compensating for a speed corresponding to the speed compensation value $\Delta\omega_m^*$, a first comparator 202 for comparing the reference speed $\omega_m^*$ with a current estimated speed $\omega_m$, a first PI controller 203 for outputting a reference torque component current $i_q^*$ for compensating for a speed error value according to the comparison result between the reference speed $\omega_m^*$ and the current estimated speed $\omega_m$, a third comparator 204 for comparing the reference torque component current $i_q^*$, the reference current $i_q\Delta\omega_m^*$ for compensating for the speed and a real torque component current $i_q$, a third PI controller 205 for outputting a reference torque component voltage $v_q^*$ on the basis of the error value obtained by comparing the reference torque component current $i_q^*$, the reference current $i_q\Delta\omega_m^*$ for compensating for the speed and the real torque component current $i_q$, a second PI controller 15 for outputting a reference magnetic flux component current for compensating for an error value between a reference magnetic flux component current $i_d^*$ and a real magnetic flux component current $i_d$ as a reference magnetic flux component voltage $v_d^*$, a synchronous/stationary coordinate converter 17 for converting the reference magnetic flux component voltage $v_d^*$ and the reference torque component voltage $v_q^*$ from a synchronous coordinate system to a stationary coordinate system according to sine and cosine values (sin θ and cos θ) in a real magnetic flux angle θ, a three-phase voltage generator 18 for converting the reference magnetic flux component voltage $v_d^*$ and the reference torque component voltage $v_q^*$ of the stationary coordinate system into three-phase voltages Vas, Vbs and Vcs, an inverter 19 for supplying the three-phase voltages Vas, Vbs and Vcs generated in the three-phase voltage generator 18 to the motor, a rotor position detector 22 for detecting a position of the rotor of the motor, a speed operator 24 for outputting the current estimated speed $\omega_m$ from the detected position of the rotor, a signal generator 23 for generating the sine and cosine values (sin θ and cos θ) in the real magnetic flux angle θ from the detected position of the rotor, a two-phase current generator 20 for converting three-phase currents detected when the motor is rotated into two-phase currents $i_\alpha, i_\beta$, and a stationary/synchronous coordinate converter 21 for converting the two-phase currents $i_\alpha, i_\beta$ into a rotational coordinate system, and outputting the real torque component current $i_q$ and the magnetic flux component current $i_d$. Here, a second comparator 14 of FIG. 7 compares the reference magnetic flux component current $i_d^*$ with the real magnetic flux component current $i_d$ from the stationary/synchronous coordinate converter 21, and outputs the resulting error value to the second PI controller 15.

The apparatus 200 for compensating for the speed error of the motor in accordance with the second embodiment of the present invention includes the speed compensator 201 for dividing the rotational section corresponding to one complete revolution of the rotor of the motor into the plurality of preset rotational sections, comparing the reference speed $\omega_m^*$ with the previous estimated speed $\omega_p$ in each divided rotational section, calculating the previous speed error according to the comparison result, determining the speed compensation value $\Delta\omega_m^*$ for compensating for the previous speed error, and outputting the speed compensation value $\Delta\omega_m^*$, the fourth PI controller 206 for generating the reference current $i_q\Delta\omega_m^*$ for compensating for the speed corresponding to the speed compensation value $\Delta\omega_m^*$, the first comparator 202 for comparing the reference speed $\omega_m^*$ with the current estimated speed $\omega_m$, the first PI controller 203 for outputting the reference torque component current $i_q^*$ for compensating for the speed error value according to the comparison result between the reference speed $\omega_m^*$ and the current estimated speed $\omega_m$, the third comparator 204 for comparing the reference torque component current $i_q^*$, the reference current $i_q\Delta\omega_m^*$ for compensating for the speed and the real torque component current $i_q$, and the third PI controller 205 for outputting the reference torque component voltage $v_q^*$ on the basis of the error value obtained by comparing the reference torque component current $i_q^*$, the reference current $i_q\Delta\omega_m^*$ for compensating for the speed and the real torque component current $i_q$. The apparatus for controlling the rotational speed of the motor is identical to the conventional one, except for the apparatus 200 for compensating for the speed error of the motor in accordance with the second embodiment of the present invention, and thus detailed explanations thereof are omitted.

The operation of the apparatus 200 for compensating for the speed error of the motor in accordance with the second embodiment of the present invention will now be described in detail with reference to FIG. 7.

The speed compensator 201 compares the reference speed $\omega_m^*$ with the previous estimated speed $\omega_p$, calculates the previous speed error according to the comparison result, determines the speed compensation value $\Delta\omega_m^*$ for compensating for the previous speed error, and outputs the speed compensation value $\Delta\omega_m^*$. That is, the speed compensator 201 compares the reference speed $\omega_m^*$ with the previous estimated speed $\omega_p$ in the preset rotational sections (for example, four rotational sections), detects the speed error in each rotational section according to the comparison result, determines the speed compensation value $\Delta\omega_m^*$ for compensating for the detected speed error, and outputs the determined speed compensation value $\Delta\omega_m^*$ to the fourth PI controller 206.

The fourth PI controller 206 generates the reference current $i_q\Delta\omega_m^*$ for compensating for the speed corresponding to the speed compensation value $\Delta\omega_m^*$, and outputs the reference current $i_q\Delta\omega_m^*$ for compensating for the speed to the third comparator 204.

On the other hand, the first comparator 202 compares the reference speed $\omega_m^*$ with the current estimated speed $\omega_m$, and outputs the speed error value to the first PI controller 203 according to the comparison result.

The first PI controller 203 generates the reference torque component current $i_q^*$ for compensating for the speed error value according to the comparison result between the reference speed $\omega_m^*$ and the current estimated speed $\omega_m$, and outputs the reference torque component current $i_q^*$ to the third comparator 205.

The third comparator 204 compares the reference torque component current $i_q^*$, the reference current $i_q\Delta\omega_m^*$ for compensating for the speed and the real torque component current $i_q$, and outputs the error value according to the comparison result.

The third PI controller 205 outputs the reference torque component voltage $v_q^*$ for compensating for the error value obtained by comparing the reference torque component current $i_q^*$, the reference current $i_q\Delta\omega_m^*$ for compensating for the speed and the real torque component current $i_q$. Therefore, the reference torque component voltage $v_q^*$ is outputted to the apparatus for controlling the rotational speed of the motor, thereby compensating for the speed error resulting from the load characteristics such as the compressor.

Accordingly, the speed error resulting from the load characteristics such as the compressor can be compensated for, by comparing the reference speed with the previous estimated speed in the plurality of preset rotational sections, and compensating for the speed error of the motor according to the comparison result.

On the other hand, the apparatus for compensating for the speed error of the motor in accordance with the present invention can be applied to various apparatuses for controlling a rotational speed of a motor.

As discussed earlier, in accordance with the present invention, vibrations and noises can be reduced by decreasing the speed ripple of the motor resulting from the load characteristics, by dividing the rotational section corresponding to one complete revolution of the rotor of the motor into the plurality of preset rotational sections, comparing the reference speed with the previous estimated speed in each divided rotational section, determining each speed compensation value, and compensating for the speed error between the reference speed and the current estimated speed on the basis of each speed compensation value. That is, the speed ripple of the motor resulting from the torque ripple of the load can be reduced by comparing the reference speed with the previous estimated speed in the plurality of preset rotational sections, and compensating for the speed error of the motor. Furthermore, vibrations and noises resulting from the load characteristics can be reduced without presetting the reference position of the rotor of the motor or requiring experimental data such as a lookup table.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for compensating for a speed error of a motor, comprising:
    a speed compensator that divides a rotational section corresponding to one complete revolution of a rotor of the motor into a plurality of preset divided rotational sections, compares a reference speed of the motor with a previous estimated speed in each divided rotational section, calculates the speed error of the motor according to a result of the comparison between the reference speed of the motor and the previous estimated speed in each divided rotational section, and determines a speed compensation value for compensating for the speed error;
    a comparator that compares the speed compensation value, the reference speed and a current estimated speed of the motor; and
    a proportional integration controller that outputs a reference torque component current for compensating for the speed error of the motor according to the result of the comparison between the speed compensation value, the reference speed and the current estimated speed of the motor.

2. The apparatus of claim 1,
    wherein the speed compensation value $\Delta\omega_m^*$ is represented by $\Delta\omega_m^* = k(\omega_m - \omega_m^*)$,
    wherein, $\omega_m$ denotes the current estimated speed, $\omega_m^*$ denotes the reference speed, and k denotes an error compensation value.

3. The apparatus of claim 1, wherein the proportional integration controller adds the speed compensation value to the error value with respect to the current estimated speed, and outputs the reference torque component current corresponding to the added value.

4. An apparatus for compensating for a speed error of a motor, comprising:
    a speed compensator that compares a reference speed of the motor with a previous estimated speed, calculates a previous speed error according to a result of the comparison between the reference speed of the motor and the previous estimated speed, and determines a speed compensation value for compensating for the previous speed error, wherein the speed compensator divides a rotational section corresponding to one complete revolution of a rotor of the motor into a plurality of preset rotational sections, compares the reference speed with the previous estimated speed in each divided rotational section, detects the speed error in each rotational section according to a result of the comparison between the reference speed and the previous estimated speed in each divided rotational section, and determines the speed compensation value for compensating for the detected speed error;
    a first proportional integration controller that generates a reference current for compensating for a speed corresponding to the speed compensation value;
    a first comparator that compares the reference speed with a current estimated speed, and outputs a resulting speed error value;
    a second proportional integration controller that outputs a reference torque component current for compensating for the speed error value of the first comparator;
    a second comparator that compares the reference torque component current, the reference current for compensating for the speed and a real torque component current, and outputs a resulting error value; and
    a third proportional integration controller that outputs a reference torque component voltage for compensating for the error value of the second comparator,
    wherein the speed compensation value $\Delta\omega_m^*$ is represented by $\Delta\omega_m^* = k(\omega_m - \omega_m^*)$, wherein, $\omega_m$ denotes the current estimated speed, $\omega_m^*$ denotes the reference speed, and k denotes an error compensation value.

* * * * *